United States Patent [19]

Rench et al.

[11] Patent Number: 5,038,484

[45] Date of Patent: Aug. 13, 1991

[54] APPARATUS FOR DETERMINING AN AREA COVERAGE RATE

[75] Inventors: Quentin H. Rench, Racine, Wis.; Steven Jacobs, Arcata, Calif.

[73] Assignee: Von Schrader Company, Racine, Wis.

[21] Appl. No.: 379,618

[22] Filed: Jul. 14, 1989

[51] Int. Cl.$^5$ .................... A47L 11/10; G01B 5/26; G01B 7/32
[52] U.S. Cl. ........................... 33/124; 33/121; 15/340.2; 15/340.1; 15/339; 73/227
[58] Field of Search ............... 33/121, 123, 124, 708, 33/773, 772, 792; 15/41 A, 41 R, 340.1, 340.2, 319, 339, 354; 73/227

[56] References Cited

U.S. PATENT DOCUMENTS

| | | | |
|---|---|---|---|
| 3,789,939 | 2/1974 | Geislinger | 15/319 |
| 4,058,712 | 11/1977 | Bachman | 33/123 |
| 4,114,711 | 9/1978 | Wilkins | 15/319 |
| 4,229,799 | 10/1980 | Herwig | 33/123 |
| 4,486,890 | 12/1984 | Hammes | 33/123 |
| 4,506,405 | 3/1985 | Block | 15/340.1 |
| 4,532,710 | 8/1985 | Kinney et al. | |
| 4,675,935 | 6/1987 | Kasper et al. | 15/319 |
| 4,700,427 | 10/1987 | Kuepper | 15/319 |
| 4,782,550 | 11/1988 | Jacobs | 15/340.1 |
| 4,825,500 | 5/1989 | Basham et al. | 15/319 |

FOREIGN PATENT DOCUMENTS 0169379 1/1986 European Pat. Off. ............. 33/121

Primary Examiner—William A. Cuchlinski, Jr.
Assistant Examiner—William C. Dowling
Attorney, Agent, or Firm—Peter N. Jansson

[57] ABSTRACT

An apparatus for determining an area of a surface which is traversed and treated by an object during a unit of time is configured for use with a moveable object that has a first axis of a known length. The object is capable of movement along a second axis and the first and second axes define an angle between them which is other than 0°. A signalling means includes a sensor which may be mounted in a motion-sensing relationship to the object for providing a motion signal when the object moves a distance along the second axis. The motion signal has a predetermined relationship to that distance. A timing means repetitively provides a plurality of timing signals, each sequential pair of which defines an interval of time of known duration. A computing means is coupled to the timing means and to the signalling means for receiving at least one sequential pair of timing signals and at least one motion signal. The computing means thereby initiate a display of the area of the surface which is traversed by the first axis per unit of time and therefore treated as the object moves along the second axis.

17 Claims, 3 Drawing Sheets

APPARATUS FOR DETERMINING AN AREA COVERAGE RATE

FIELD OF THE INVENTION

This invention is related generally to apparatus for treatment of surfaces such as floors, roadways and the like which present at least surface segments that are generally planar. More particularly, the invention relates to an apparatus for determining an area of such a surface traversed and treated by an object per unit of time.

BACKGROUND OF THE INVENTION

Various devices and methods have been developed in the past for the treatment of surfaces such as floors, roadways and the like where the surface to be treated, if not planar, has segments which are generally so. While a carpeted floor surface is obviously practically planar, a roadway or any other exemplary surface may be considered planar for the purpose of the invention if it has an axis lateral to the path traversed by the object which is generally straight and if the radius of curvature of the path traversed by the object is very large compared to the size of the object. Examples of the latter circumstances include street sweepers and road graders, both of which treat the travelled surface.

It is known that the rate at which a given apparatus can treat or otherwise prepare a particular surface per unit of time will depend in significant part upon the initial condition of the surface. Other factors such as the skill of the operator may also affect the rate at which a surface may be treated. When treating such surfaces, it is often useful for the operator to be able to readily ascertain the coverage rate at which the apparatus is proceeding across the surface and this information, coupled with personal observations of the operator, will permit the apparatus to be moved across the surface at the maximum speed consistent with satisfactory treatment.

As an example, persons who operate machines for applying cleaning products to carpets are confronted with carpets having widely varying surface characteristics and/or imbedded soil. A short pile carpet which is only lightly soiled may be cleaned at a more rapid rate than might a heavily soiled, deep pile or shag carpet. Confronted with any of the foregoing situations, experience, experimentation and judgment will usually suggest to an operator the maximum coverage rate at which a particular carpet surface may be cleaned. The invention will be highly beneficial in maintaining that rate.

As another example, an operator of a road grading machine may undertake to prepare and treat road surfaces, one of which has only sparsely distributed, small projecting imperfections and a second road surface on which such imperfections are both frequent and sizeable. Therefore, satisfactory treatment of the second road surface can only result if the machine is moved thereacross at a substantially lower rate compared to the first road surface.

Since apparatus such as the described carpet cleaning and road treating machines are relatively expensive and since their operation requires a skilled operator who is appropriately compensated for such skills, it is important at least for cost-saving reasons to operate the apparatus so that it traverses and treats a surface area in the minimum time, consistent with acceptable results. Prior efforts in this regard have resulted in machines operated totally according to the judgment and skill of the operator, which may be less than fully satisfactory. One result of such operation is that the machine may be used at a rate which underutilizes its capability. Another possible result is that the machine is used at a treatment rate in excess of that required to properly treat the surface and poor or unacceptable treatment results.

An apparatus which determines and makes available to the machine operator the area of a surface traversed and treated by an object per unit of time would be an important advance in the art. This is so since once the optimum treatment rate for a particular surface is determined—by judgment, experimentation or otherwise—this rate may be used as the standard for the most rapid utilization of such machines, consistent with acceptable quality of treatment. It would therefore be responsive to a long-standing need for a practical, easily usable apparatus which can dramatically reduce costs relating to labor and machine utilization.

OBJECTS OF THE INVENTION

It is an object of this invention to provide an apparatus for determining the rate of area coverage of a surface which overcomes some of the problems and shortcomings of the prior art including those mentioned above.

Another object of the invention is to provide such an apparatus which can reduce labor costs in tasks involving the treatment of surfaces.

Still another object of the invention is to provide such an apparatus which permits the most rapid treatment of a surface consistent with acceptable quality.

Yet another object of this invention is to provide such an apparatus which continuously displays to the operator the rate at which a machine is traversing and treating a surface area.

Still another object of the invention is to provide such an apparatus which may be readily adapted to a variety of types of surface treating machines.

How these and other important objects are accomplished will be apparent from the description of the invention which follows.

SUMMARY OF THE INVENTION

An apparatus for determining an area of a surface which is traversed and treated by an object during a unit of time is configured for use with a moveable object that has a first axis of a known length. The object is capable of movement along a second axis and the first and second axes define an angle between them which is other than 0°. A signalling means includes a sensor which may be mounted in a motion-sensing relationship to the object for providing a motion signal when the object moves a distance along the second axis. The motion signal has a predetermined relationship to that distance. A timing means repetitively provides a plurality of timing signals, each sequential pair of which defines an interval of time of known duration. A computing means is coupled to the timing means and to the signalling means for receiving at least one sequential pair of timing signals and at least one motion signal. The computing means thereby initiates a display of the area of the surface which is traversed by the first axis per unit of time and therefore treated as the object moves along the second axis.

More specifically, the invention is described with respect to a carpet cleaning machine, only one example of a beneficial application for the invention. A carpet cleaning machine usually has its component which performs the cleaning operation, a brush or foam application nozzle, arranged along a first axis which is generally normal to the second axis of travel. In a machine such as a road grader or sweeper, the surface treating component, a blade or a rotating brush, are often disposed during use along a first axis which defines an angle less than 90° with respect to the second axis of travel.

In any of those examples, the area of the surface traversed for each increment of distance travelled along the second axis may be readily computed. For example, if a carpet cleaning machine is equipped with a brush which is disposed generally normal to the second axis and which has a length of two feet, an area of six square feet will be treated for each three feet in linear distance that the machine moves along the second axis. Additionally, if the rate at which the machine is moved along the second axis can be measured or determined, the rate of treatment coverage, in area per unit time, can be determined. In the foregoing example, if the carpet cleaning machine moved along the second axis for a distance of three feet in two seconds, the machine will have treated carpet at the rate of 10,800 square feet per hour.

The apparatus of this invention may be used with an object that includes a carriage and a treating means, e.g. brush, mounted on the carriage to interact with the surface to be treated. For purposes of computing area coverage rate, the dimension of the exemplary brush will be the dimension of the part of the brush in contact with the carpet and projected to a plane normal to the second axis of travel. The object will preferably be equipped with a rotating member, such as a wheel, which is mounted on the carriage. The apparatus includes a sensor to be mounted in a motion detecting relationship to the wheel for providing input pulses as the carriage moves along the second axis. This sensor co-acts with other portions of the signalling means for providing a plurality of input pulses as the carriage moves along the second axis. A timing section repetitively provides a plurality of timing signals, each sequential pair of which defines an interval of time of known duration. These timing signals are used to periodically update the display as described following, and the interval of time is selected in view of the application.

For example, in a road treating operation, the interval of time may be selected to be 15-20 seconds since the speed of the machine is governed by engine throttle and is relatively constant. On the other hand, an interval of 2-4 seconds is more appropriate for a carpet cleaning machine since this interval will "damp out" slight variations in the walking speed of the operator while yet providing a rate of coverage display which is sufficiently current in view of the fact that a walking operator may change pace very quickly.

A computing section is coupled to the timing section and to the signalling section for receiving the timing signals and the output pulse strings, the latter being generated by the signalling section in response to the input pulses. The computing section is arranged to count the number of individual pulses included in output pulse strings and received by the computing section during the interval of time as determined by the timing section. The computing section initiates and periodically updates a display of the surface area being traversed by the first axis for the selected unit of time and as the machine is moved along the second axis.

There are several approaches by which the sensor may co-act to result in the generation of input signals. For example, small magnets may be mounted on the side of the wheel and at regularly spaced intervals in a circular pattern which is concentric with the wheel axis. These magnets could be used to operate a reed switch sensor. Other approaches include the use of a proximity sensor capable of detecting projections similarly arranged on the wheel or a photo sensor may be used. However, for lowest cost and highest reliability, a Hall effect sensor is preferred.

As the wheel rotates and each individual magnet comes into close proximity of the Hall sensor, an input signal is generated thereby and is directed to a pulse conditioner which generates an output pulse for each received input signal. The output pulse actuates an output pulse string generator which generates a plurality of output pulses, a string of pulses, for each input signal received at the pulse conditioner. The number of individual pulses which constitute each output pulse string is preferably adjustable for the reasons and in the manner described in detail following. The individual pulses which make up each of the output pulse strings are directed to a computing section which registers each pulse and upon the receipt of a reset signal from the timing section, the computer stores the pulse count and causes its display, by an LED panel for example, for reference by the operator. The operator may then adjust the speed of the machine along the second axis to provide desired treatment rate. Using the example of the carpet cleaning machine, a lightly soiled short pile carpet may be capable of being cleaned at the rate of 12,000 square feet per hour while the same carpet which is heavily soiled should be cleaned at no more than about 7,000 square feet per hour.

The degree of control and efficiency which results from use of the invention allows more efficient surface treating operations, better use of human and machine resources and very likely, a higher quality result.

DETAILED DESCRIPTION OF PREFERRED EMBODIMENTS

Figure 1:
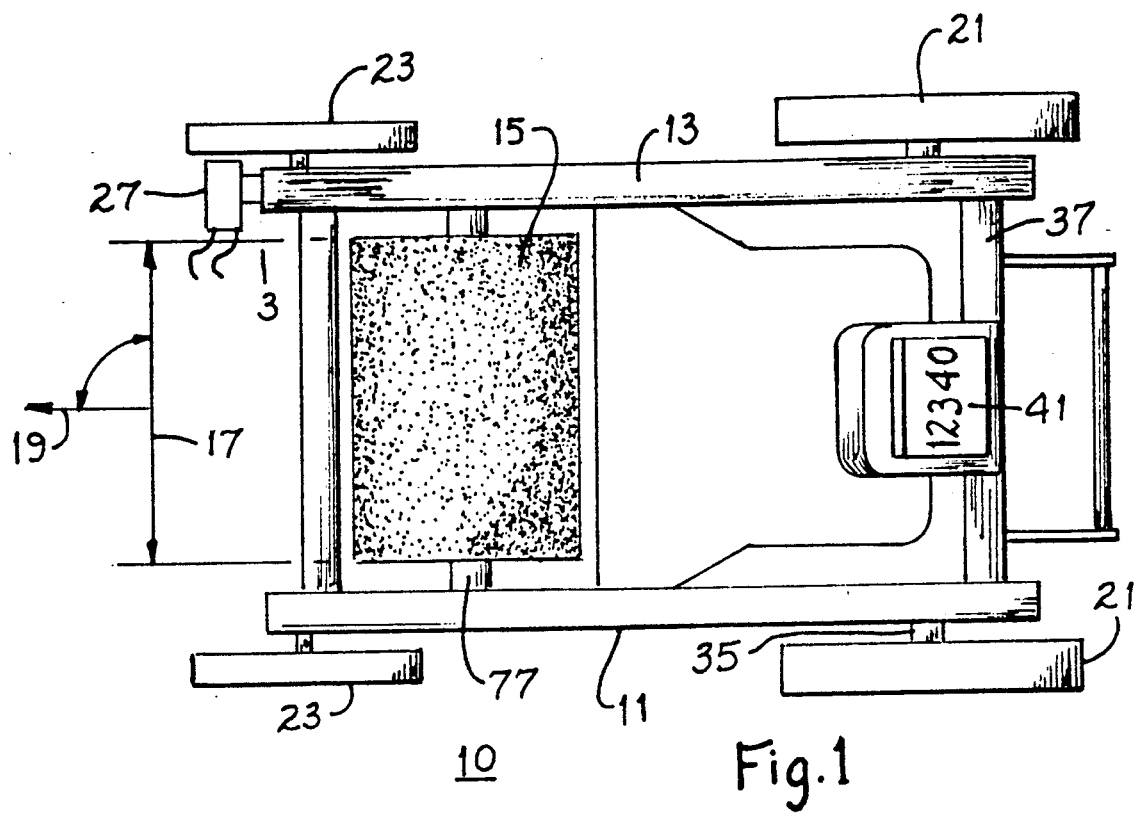
FIG. 1 is a simplified top plan view of aspects of the invention shown in conjunction with a carpet cleaning machine, with parts removed for clarity.
Figure 2:
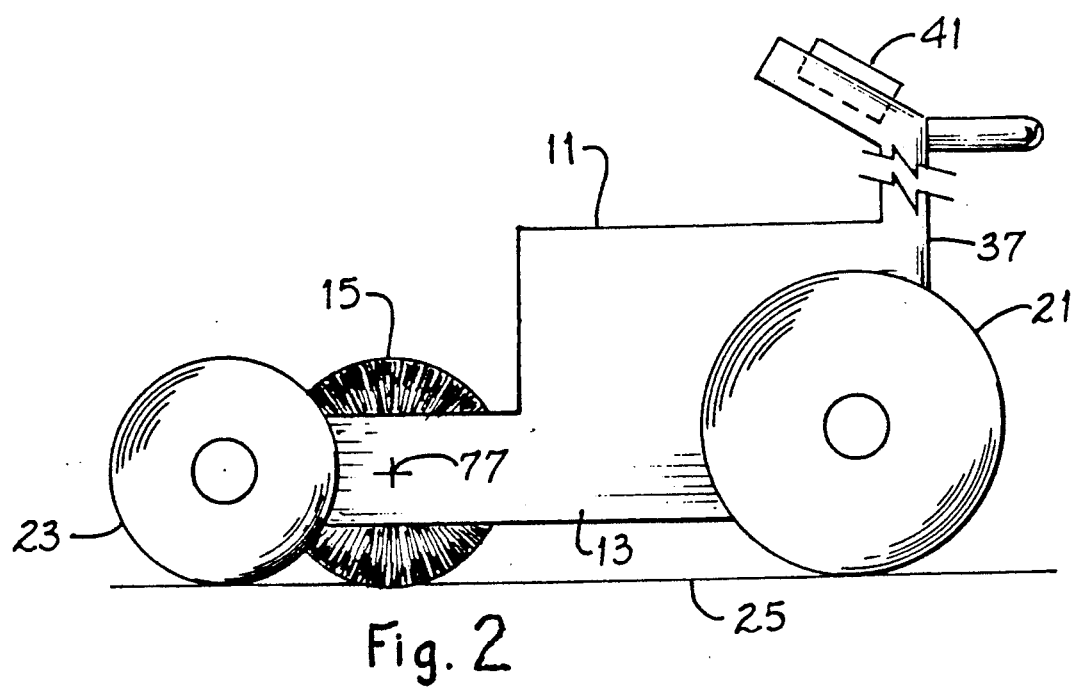
FIG. 2 is a side elevation view of the carpet cleaning machine shown in FIG. 1.

The figures illustrate the apparatus 10 in conjunction with a carpet cleaning machine. Other preferred embodiments of the invention are also shown and described.

Referring first to FIGS. 1 through 5, a highly preferred apparatus 10 is shown in conjunction with a floor treating machine 11 such as those used for cleaning carpets. The machine 11 includes a carriage 13 which may include motor(s) (not shown) for self propulsion or merely for actuating the floor treating means 15 such as a revolving, cylindrical shaped brush supported on the carriage 13. The brush 15 has a dimension measured along a first axis 17 and the machine 11 is capable of movement along a second axis 19 which, for a machine of this type, is generally normal to the first axis 17. The carriage 13 and the floor treating means 15 are supported by a pair of rear wheels 21 and a pair of front wheels 23, all rotatably mounted on the carriage 13 for support thereof as the machine 11 moves across the floor 25. A sensor 27, part of the signalling means 28, is mounted in rotation detecting relationship to the wheel 23, the latter having means 29 for initiating an input pulse from the sensor 27 as the wheel 23 rotates during movement of the machine 11 along the second axis 19.

Figure 4:
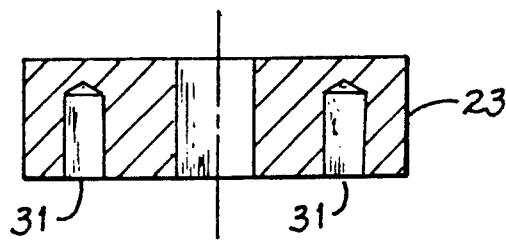
FIG. 4 is a cross-sectional view of the wheel of FIG. 3 taken normal to the plane 4-4 of FIG. 3.
Figure 3:
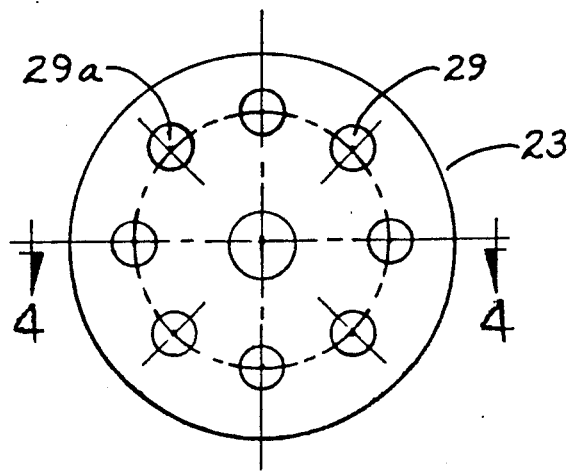
FIG. 3 is a side elevation view, greatly enlarged, of a wheel of the carpet cleaning machine shown in FIGS. 1 and 2, the view being taken along the axis 3 of FIG. 1.
Figure 5:
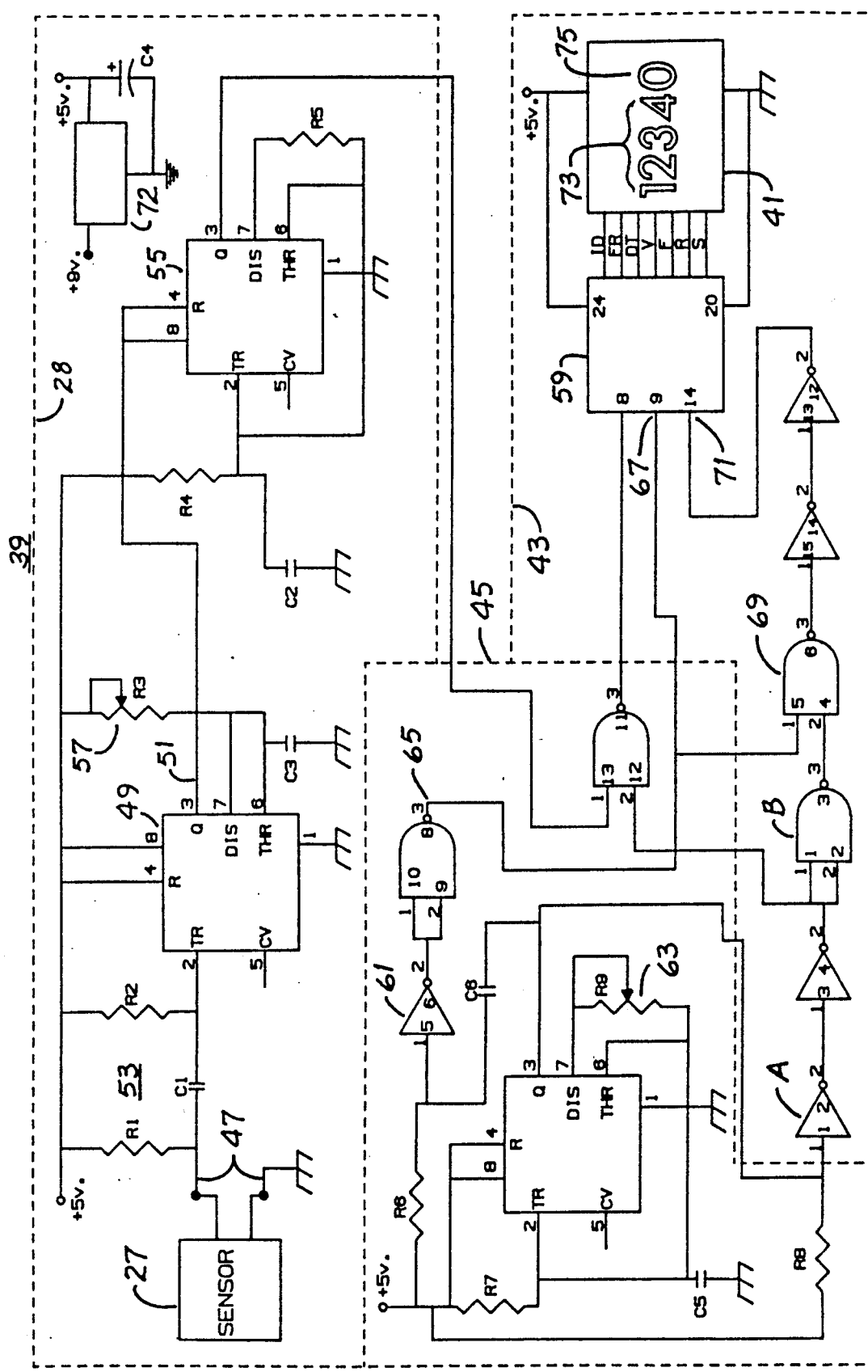
FIG. 5 is an electrical schematic diagram of the display circuit of the invention.

Referring next to FIGS. 4 and 5, means 29 is preferably embodied as a plurality of small magnets 29a, each of which may be inserted in a pocket 31 formed in the side of the wheel 23. The pockets 31 are disposed at regularly spaced intervals about a circle which is concentric with the rotation axis 33 of the wheel 23. In the alternative, these permanent magnets may be affixed to the side of the wheel 23 by adhesive or the like. The manner in which the preferred number of magnets is selected will be described in detail following. The signalling means 28 also includes the sensor 27 supported on the machine 11 to be in close proximity to the magnets 29a and therefore, in rotation detecting relationship to the wheel 23. In a highly preferred embodiment, the sensor 27 will be a Hall effect transistor which is in sufficiently close but non-contacting proximity to generate an input pulse as each magnet 29a passes in close proximity thereto. To help keep the sensor 27 clean and to protect it from mechanical damage, it is preferred that the sensor 27 be mounted adjacent an upper quadrant of the wheel 23. If the presence of dirt and/or high likelihood of physical damage so suggests, the sensor 27 may be mounted in rotation-sensing relationship to a wheel which is other than a load-bearing wheel 21, 23. Such a wheel may be coupled to the machine drive axle 35 or to a load bearing wheel 21, 23 in a known manner, e.g., by idler gears or pulleys, so that it might be located well away from the surface 25 to be treated.

A pedestal 37 extends from the carriage 13 and is constructed to house the display circuit 39 including the display panel 41 whereby the machine operator may be visually apprised of the rate at which the machine 11 is treating a floor area per unit time.

Referring additionally to FIG. 5, the display circuit 39 is shown to include signalling means 28 for providing an output pulse string, computing means 43 for receiving and registering this pulse string and generating a resulting display and timing means 45 for periodically updating the display.

The signalling means 28 includes the sensor 27 which is electrically coupled to the input terminals 47 for providing an input signal to the pulse conditioner 49. As is apparent from the foregoing, an input signal emanates from the sensor 27 each time a magnet 29a comes to close proximity thereto. The pulse conditioner 49 emits a square wave signal along its output line 51 and this signal persists in a binary "1" state for a time determined and fixed by the values of the resistor-capacitor network 53 connected to the input of the conditioner 49. So long as this binary "1" persists, the output pulse string generator 55 will be switched to a conducting state and will provide a sequential series of individual pulses, the number of which may be selected by adjusting the value of the resistor 57. As described following, this number of individual pulses will be selected to have a predetermined relationship to the number of input pulses which define the motion signal. As the individual pulses are emitted by the generator 55, they are registered by the integrated circuit 59.

The timing means 45 includes a gate control 61 which provides a binary "1" reset signal once for each interval of time as may be selected by adjusting the value of the resistor 63. In the exemplary carpet cleaning machine 11, the resistor 63 is adjusted to result in a reset signal approximately once each two seconds. This time is sufficiently short to provide the operator of the machine 11 with a contemporary display which indicates the area of the carpet being traversed and treated per unit time and which recognizes that a walking operator may change pace very quickly. On the other hand, this delay is sufficiently long to "damp out" slight variations in the walking speed of the operator.

Upon emission of a reset signal at the output line 65, that signal is directed to the pin 67 of the integrated circuit 59 which causes the circuit 59 to store the then-existing count of individual pulses. The reset signal is simultaneously directed to a delay line 69 and is received at the pin 71 at a time which is slightly delayed from that at which the signal is received at the pin 67. This delay line signal clears the counter and, in effect, returns it to zero. A power supply 72 provides a regulated output voltage of 5VOC from an unregulated 9VDC input voltage.

Areas of carpet being cleaned are often measured in thousands of square feet per hour up to a maximum of 15,000-20,000 square feet per hour. However, an economical display panel 41 includes four operative digits 73 with a fifth digit 75 being constantly illuminated as a zero. Therefore, the actual number of individual pulses displayed will, in the described embodiment, be multiplied by ten as viewed.

For the purpose of describing the manner in which certain parameters of the inventive apparatus 10 are selected, it will be assumed that selection is related to an apparatus embodied as a carpet cleaning machine 11. Referring to the FIGURES, it is further assumed that the longitudinal rotational axis 77 of the brush 15 is normal to the second axis 19 of travel and that the first axis 17, the width of the brush 15, is two feet in length. For the purposes of the illustration, it is also assumed that the wheel 23 includes ten permanent magnets 29a disposed about the side thereof and that the wheel 23 has a diameter of 2.75 inches, i.e., a circumference of 0.722 feet. Therefore, as the machine 11 traverses a distance of one foot, the wheel 23 will have made approximately 1.4 revolutions resulting in fourteen ($10 \times 1.4$) input signals per foot of travel along the second axis 19 and resulting in two square feet of carpet being cleaned. At the exemplary travel rate along the second axis 19 of one foot per second, the rate of cleaning carpet will be 7,200 square feet per hour, the figure which should appear on the display panel 41 at that cleaning rate. However, the sensor 27 has provided only fourteen input pulses for each one foot of travel and therefore, it is required that each pulse be effectively multiplied if the count stored in the integrated circuit and displayed is to be correct. Therefore, using the described display panel 41 having a constantly illuminated zero as the last digit, the displayed count is required to be 720 pulses. Therefore, a pulse multiplication factor of 720 divided by 14 or about 51 is required to achieve the described display. This multiplication factor may be achieved by proper selection and adjustment of the value of the resistor 57. Stated another way, each input signal to the pulse conditioner 49 results in an output string from the generator 55 which has 51 individual pulses therein, such pulses being counted and stored by the integrated circuit 59. From the foregoing, one of ordinary skill may readily deduce the manner in which one may select the number of magnets 29a, the multiplication factor and other parameters as may be suitable for a particular application. In general, the lower the rate of travel of the machine 11 along the second axis 19, the greater should be the number of magnets 11 disposed on a surface-contacting wheel 23 in order to result in a display which is substantially continuously illuminated and therefore easy to read.

Figure 6:
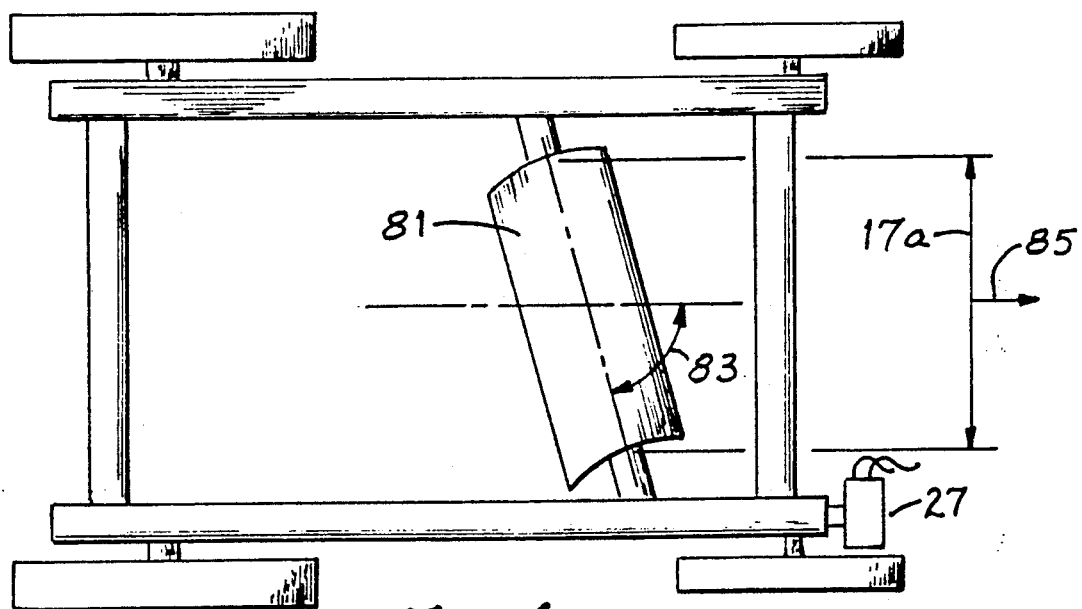
FIG. 6 is a simplified conceptual sketch, in top plan view, of another application for the invention, namely a machine for treating the surface of a road.

Referring next to FIG. 6, the apparatus 10 may be used in conjunction with a simplified depiction of a road grader 79, another type of surface treatment machine. This application differs from that of a carpet cleaning machine 11 in that the surface treating device, the blade 81, is mounted angularly to define an angle 83 with respect to the second axis of travel 85 which is greater than 0° but less than 90°. In that instance, the effective length of the first axis 17a will be not the actual length of the blade 81 but rather, its length projected to a plane normal to the second axis 85.

The following component values have been found useful in the construction of the invention:

| | |
|---|---|
| R1, R6 - 10K | R2 - 1 meg. |
| R3 - 500k | R4 - 511 ohm |
| R5 - 5.1K | R7 - 2 meg. |
| R8 - 3K | R9 - 100K |
| C1 - .022 mf | C2, C6 - 0.47 mf |
| C5 - 30 mf | C4 - 2200 mf |
| Item 72 - LM 7805 | Items 49, 55 and equal - LM 555 |
| Items A and equal - 7404 | Item B and equal - 7400 |
| Item 59 - Intersil IC 7217 | |

While the principles of this invention have been described in connection with specific embodiments, it should be understood clearly that these descriptions are made only by way of example and are not intended to limit the scope of the invention.

We claim:

1. An apparatus for displaying the surface area being treated by a machine per unit of time including:
   signalling means for use with a movable machine, said machine having a surface treating device mounted thereon, said device having a first axis of a known length, said machine being capable of movement along a second axis, said first axis and said second axis defining an angle therebetween which is other than zero degrees;
   said apparatus including a sensor installed in motion-sensing relationship to a rotating member mounted on the machine for providing a motion signal when the machine moves a distance along said second axis, said motion signal having a predetermined relationship to said distance;
   timing means for repetitively providing a plurality of reset signals, each sequential pair of which defines an interval of time;
   computing means calibrated in view of the projected length of the surface treating device and coupled to said timing means and to said signalling means for receiving at least one sequential pair of said timing signals and at least one motion signal initiating a periodically updated display of the area of the surface traversed by said first axis per unit of time as the machine moves along said axis, the machine thereby being adopted to treat the surface area at a rate selected by the machine operator in view of the pretreatment condition of the surface area.

2. The apparatus of claim 1 wherein the angular rate of rotation of said rotating member has a known relationship to the rate at which such machine moves along said second axis, wherein the sensor emits input pulses and wherein the number of input pulses has a known relationship to the angular rate of rotation of said rotating member.

3. The apparatus of claim 2 wherein said signalling means generates a plurality of output pulse strings in response to said input pulses, said computing means being arranged to count the number of individual pulses included in each of said output pulse strings and received by said computing means during each of said intervals of time of known duration;
   said computing means thereby initiating a display of the surface area being treated by said object per unit of time as said object moves along said axis.

4. An apparatus for permitting the operation of a carpet cleaning machine at the highest rate which is consistent with the pre-treatment condition of the carpet to be cleaned, such apparatus including:
   a surface treating device mounted on a movable carpet cleaning machine and having a first axis of a known length, said carpet cleaning machine being capable of movement along a second axis, said first axis and said second axis defining an angle therebetween which is about 90 degrees;
   signalling means including a sensor in motion-sensing relationship to said machine for providing a motion signal when said machine moves a distance along said second axis, said motion signal having a predetermined relationship to said distance;
   timing means for repetitively providing a plurality of timing signals, each sequential pair of which defines an interval of time of known duration;
   computing means calibrated in view of the projected length of the surface treating device and coupled to said timing means and to said signalling means for receiving at least one sequential pair of said timing signals and at least one motion signal and initiating a display of the area of the surface traversed by said first axis per unit of time as said machine moves along said second axis, such display being visible to the operator to permit the operator to maintain a selected rate of travel of the machine along the second axis, such rate being selected by the operator in view of the pre-treatment condition of the carpet.

5. The invention of claim 4 wherein said machine includes a rotating member, the angular rotational displacement of which is proportional to the distance moved along said second axis by said object and said sensor is in rotation-sensing relationship to said rotating member.

6. The invention of claim 5 wherein said sensor emits said motion signal, defined as a plurality of input pulses, for each revolution of said rotating member and said signalling means generates a plurality of output pulse strings in response to said input pulses, each of said output pulse strings being characterized by a sequential series of individual pulses, the number of which has a predetermined relationship to the number of input pulses emitted by said sensor.

7. An apparatus for determining the surface area traversed and treated by a carriage per unit of time including:
  a carriage;
  treating means mounted on said carriage to interact with a surface, said treating means having a dimension measured along a first axis, said carriage being capable of movement along a second axis which is generally normal to said first axis;
  signalling means including a sensor mounted in a motion-detecting relationship to a rotating member mounted on said carriage for providing a plurality of input pulses as said carriage moves along said second axis;
  timing means embodied as a resistor-capacitor network for repetitively providing a plurality of reset signals, each sequential pair of which defines an interval of time of known duration;
  computing means calibrated in view of the projected length of the treating means and coupled to said timing means and to said signalling means for receiving said plurality of timing signals and for receiving a plurality of output pulse strings generated by said signalling means in response to said input pulses, said computing means being arranged to count the number of individual pulses including in said output pulse strings and received by said computing means during said interval of time of known duration;
  said computing means thereby initiating a display of the surface area being traversed by said first axis per unit of time as said carriage moves along said second axis, the machine thereby being adopted to treat the surface area at a rate selected by the machine operator in view of the pre-treatment condition of the surface area.

8. The apparatus of claim 7 wherein the number of said individual pulses has a known relationship to the number of said input pulses.

9. The apparatus of claim 8 wherein the angular rate of rotation of said rotating member has a known relationship to the rate at which said carriage moves along said second axis and the number of input pulses has a known relationship to the angular rate of rotation of said rotating member.

10. The apparatus of claim 9 wherein the number of said individual pulses is a multiple of the number of input pulses, said multiple being selected in view of the number of input pulses resulting from one revolution of said rotating member and in view of the area of said surface traversed by said carriage for each revolution of said rotating member.

11. A carpet cleaning machine having apparatus for determining the carpet area traversed and treated by said machine per unit time including;
  a motorized carriage;
  carpet cleaning means mounted on said carriage to interact with a carpet, said cleaning means having a dimension measured along a first axis, said machine being capable of movement along a second axis, said first axis and second axis defining an angle therebetween which is other than zero degrees;
  a wheel rotatably mounted on said carriage for engaging said floor, said wheel having means for initiating an input pulse as said wheel rotates during movement of said machine along said second axis;
  a display circuit having signalling means, said signalling means including a sensor mounted in rotation-detecting relationship to said wheel for generating a plurality of input pulses as said machine moves along said second axis;
  said display circuit further including timing means, for repetitively providing a plurality of timing signals, each sequential pair of which defines an interval of time of known duration;
  said display circuit further including computing means calibrated in view of the projected length of the carpet cleaning means and coupled to said timing means and to said signalling means for receiving said plurality of and for receiving a plurality of output pulse strings generated by said signalling means in response to said input pulses, said computing means being arranged to count the number of individual pulses including in said output pulse strings and received by said computing means during said time of know duration;
  said computing means thereby initiating and updating a display of the surface area being traversed by said machine per unit of time as said machine moves along said second axis, the machine thereby being adopted to treat the surface at a rate selected by the machine operator in view of the pretreatment condition of the surface area.

12. The machine of claim 11 wherein said means for initiating an input pulse is embodied as a plurality of permanent magnets embedded in said wheel and said signalling means provides an input pulse each time one of said magnets comes to an energizing relationship to said sensor.

13. The machine of claim 12 wherein the number of individual pulses included in an output pulse string is a multiple of the number of input pulses, said multiple being selected in view of the number of input pulses resulting from one revolution of said wheel and in view of the area of said floor traversed by said machine for each revolution of said wheel.

14. A carpet cleaning machine having apparatus for determining and displaying a carpet area traversed and cleaned by said machine per unit of time including;
  a motorized carriage;
  a brush mounted on said carriage for aiding in the cleaning of carpet, said brush having a dimension measured along a first axis, said carriage being movable at a variable rate across said carpet along a second axis;
  a wheel rotatably mounted on said carriage, said wheel having a rate of rotation which is in a known relationship to a rate at which said carriage moves along said second axis, said wheel having at least one permanent magnet embedded therein for initiating an input pulse;
  a display circuit having signalling means, said signalling means including a sensor mounted in rotation-detecting relationship to said wheel for generating a plurality of input pulses as said machine moves along said second axis, said signalling means further including an output pulse string generator for generating a plurality of individual output pulses in response to each input pulse, said pulse string generator having means for adjusting the number of said individual output pulses responsive to each said input pulse;

said display circuit further including updating timing means for repetitively providing a plurality of timing signals, each sequential pair of which defines an interval of time of known duration, each of said timing signals causing an update of the area coverage rate information displayed by said display circuit;

said display circuit further including computing means calibrated in view of the projected length of the brush and coupled to said timing means and to said signalling means for receiving said plurality of timing signals and for receiving a plurality of output pulse strings generated by said signalling means in response to said input pulses, said computing means being arranged to count the number of individual pulses included in said output pulse strings and received by said computing means during said time of known duration;

said computing means thereby initiating a display of the surface area being traversed by said machine per unit of time as said machine moves along said second axis, the machine thereby being adopted to treat the surface area at a rate selected by the machine operator in view of the pre-treatment condition of the surface area.

15. The machine of claim 14 wherein said sensor is of a type wherein rotation of said wheel may be sensed while yet avoiding physical contact between said wheel and said sensor and said wheel is an idler wheel, the rotation of which results from engagement of said wheel and said carpet.

16. A method for determining a surface area treated by a carpet cleaning machine per unit of time including:

providing a carpet cleaning machine having a display panel, a cleaning brush, a rotatable member mounted thereon and a first axis of a known length, said machine being capable of movement along a second axis, said first axis and said second axis defining an angle therebetween which is other than zero degrees;

providing a signalling means for use with said machine, said signalling means including a sensor for mounting in a rotation-detecting relationship to said rotatable member, said signalling means providing a motion signal as said machine moves along said second axis;

providing a timing means for repetitively generating a plurality of timing signals, each sequential pair of which defines an interval of time of known duration;

providing a computing means calibrated in view of the projected length of the brush and coupled to said timing means and to said signalling means for receiving at least one sequential pair of said timing signals and at least one motion signal and initiating a periodically updated display of the area of the surface traversed by said first axis per unit of time as said object moves along said second axis, the machine thereby being adopted to treat the surface area at a rate selected by the machine operator in view of the pre-treatment condition of the surface area.

17. The method of claim 16 wherein said motion signal is defined as a plurality of input pulses for each revolution of said rotating member and said signalling means generates a plurality of output pulse strings in response to said input pulses, each of said output pulse strings being characterized by a sequential series of individual pulses, the number of which has a predetermined relationship to the number of said input pulses.

* * * * *